United States Patent
Fechine et al.

(10) Patent No.: US 10,101,432 B2
(45) Date of Patent: Oct. 16, 2018

(54) SYSTEM AND METHOD FOR POSITION AND PROXIMITY DETECTION

(71) Applicant: GENERAL ELECTRIC COMPANY, Schenectady, NY (US)

(72) Inventors: Dmitri Fechine, Fountaindale (AU); Steven Clifton, Fountaindale (AU)

(73) Assignee: General Electric Company, Schenectady, NY (US)

(*) Notice: Subject to any disclaimer, the term of this patent is extended or adjusted under 35 U.S.C. 154(b) by 127 days.

(21) Appl. No.: 15/226,151

(22) Filed: Aug. 2, 2016

(65) Prior Publication Data
US 2018/0038938 A1 Feb. 8, 2018

(51) Int. Cl.
*B60Q 9/00* (2006.01)
*G01S 5/02* (2010.01)
*G05D 1/00* (2006.01)
*G01S 13/00* (2006.01)
*G01S 13/88* (2006.01)

(52) U.S. Cl.
CPC ............. *G01S 5/0263* (2013.01); *B60Q 9/00* (2013.01); *G01S 13/88* (2013.01); *G05D 1/0088* (2013.01); *G05D 2201/021* (2013.01)

(58) Field of Classification Search
None
See application file for complete search history.

(56) References Cited

U.S. PATENT DOCUMENTS

| | | | |
|---|---|---|---|
| 5,793,309 A | 8/1998 | Nellson | |
| 7,768,392 B1* | 8/2010 | Brand | G01D 21/00 340/539.13 |
| 9,081,046 B2 | 7/2015 | Frederick | |
| 2006/0215020 A1* | 9/2006 | Mori | B60R 1/00 348/119 |
| 2008/0117023 A1* | 5/2008 | Wilcox | G06Q 10/08 340/10.1 |
| 2012/0173130 A1* | 7/2012 | Tsuda | G08G 1/096716 701/117 |
| 2013/0038320 A1* | 2/2013 | Frederick | G01R 33/0206 324/207.13 |

* cited by examiner

*Primary Examiner* — Kevin P Mahne
(74) *Attorney, Agent, or Firm* — GE Global Patent Operation; John A. Kramer

(57) ABSTRACT

A system includes a first vehicle having an emitter configured to emit a high RF signal synchronously with at least one EM pulse, and a receiver unit located remote from the first vehicle. The receiver unit includes a magnetic field receiver, an RF transceiver, and a processing module coupled to the RF transceiver and the magnetic field receiver. The receiver unit is configured to receive the high RF signal and the at least one EM pulse from the first vehicle and to determine a proximity of the first vehicle to the receiver unit.

14 Claims, 4 Drawing Sheets

SYSTEM AND METHOD FOR POSITION AND PROXIMITY DETECTION

BACKGROUND

Technical Field

Embodiments of the invention relate generally to vehicles. Certain embodiments relate to systems and methods for detecting the position and proximity of objects in an environment.

Discussion of Art

Knowledge of the location of a vehicle relative to its environment is crucial, particularly for autonomous vehicles. Presently there are a number of systems which utilize electromagnetic energy to detect objects within an environment and to measure relative distances between objects. For example, conventional electromagnetic energy ("EM")-based distance measuring systems typically use received signal strength indicators for proximity detection, while the EM carrier is modulated with transmitter identification data. Due to the EM frequency being inherently very low (i.e., on the order of a few kilohertz), it takes quite a long time for any data to be transmitted on top of it. This, in turn, reduces the maximum number of competing transmitters that may be reliably identified within a given space or environment and within a limited amount of time. In addition, the distance measurement time is also quite long and is not particularly suitable for objects moving at higher speeds.

Another issue associated with existing EM-based distance monitoring systems is the need to negotiate, in real-time, the transmission slots for all the EM transmitters within the given environment or reception area to avoid on-air collisions. Particularly in environments where the number of transmitters is fluid (e.g., where a growing number of transmitters randomly move in an out of the environment or reception area), such as on roadways, and given the relatively long duration of the EM broadcasts, this problem can quickly become unmanageable, limiting the maximum number of transmitters to just a small few and increasing the distance update periods to seconds rather than milliseconds.

Other known systems utilize GPS tracking to determine the position of vehicles within an area, for use in collision avoidance and reporting, for example. While generally suitable for above ground applications, GPS tracking is not available underground, rending such systems particularly unsuitable for underground mining applications and the like.

In view of the above, there may be a need for a position and proximity detection system and method which differ from those systems and methods that are currently available.

BRIEF DESCRIPTION

In an embodiment, a system includes a vehicle having an emitter configured to emit a high radio frequency ("RF") signal synchronously with at least one EM pulse. The system also includes a receiver unit located remote from the vehicle. The receiver unit includes a magnetic field receiver, an RF transceiver, and a processing module coupled to the RF transceiver and the magnetic field receiver. The receiver unit is configured to receive the high RF signal and the at least one EM pulse from the vehicle and to determine a proximity of the vehicle to the receiver unit based on at least one of the high RF signal or the at least one EM pulse.

In an embodiment, a method includes, with an emitter on-board a first vehicle, emitting a high RF signal synchronously with at least one EM pulse. The method further includes, with a receiver unit located remote from the first vehicle (the receiver unit includes a magnetic field receiver, an RF transceiver, and a processing module coupled to the RF transceiver and the magnetic field receiver), receiving the high RF signal and the at least one EM pulse from the first vehicle. The method further includes, with the receiver unit, determining a proximity between the first vehicle and the receiver unit based on at least one of the high RF signal or the EM pulse.

In an embodiment, a system includes a receiver unit having a magnetic field receiver, an RF transceiver, and a processing module coupled to the RF transceiver and the magnetic field receiver. The RF transceiver is configured to receive a high RF signal from a vehicle that is remote from the receiver unit. The magnetic field receiver is configured to receive at least one EM pulse from the vehicle. The processing module is configured to verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module is further configured, responsive to verification that the emission did not occur synchronously, to reject the high RF signal and the at least one EM pulse for use in determining the proximity.

In an embodiment, a system includes a vehicle having an on-board navigation system configured to determine a position of the vehicle within a reception area without external references. The system also includes at least one beacon positioned at a location within the reception area along a route over which the vehicle travels. The at least one beacon stores location data of the at least one beacon within the reception area. The vehicle is configured to wirelessly receive the location data from the at least one beacon when the vehicle passes within range of the at least one beacon.

DRAWINGS

The present invention will be better understood from reading the following description of non-limiting embodiments, with reference to the attached drawings (wherever possible, the same reference characters used throughout the drawings refer to the same or like parts), wherein below:

DETAILED DESCRIPTION

Embodiments of the invention relate generally to detecting the proximity of objects within a reception area. Certain embodiments relate to systems and methods for detecting the proximity of objects or vehicles in relation to a subject vehicle within a reception area or environment. In one embodiment, a system for proximity detection includes a first vehicle having an emitter configured to transmit/emit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit is configured to receive the high RF signal and the at least one EM pulse from the first vehicle and to determine a proximity of the first vehicle to the receiver unit. In a particular embodiment, the proximity of the first vehicle to the receiver unit is calculated in dependence upon received magnetic field strength.

Figure 1:
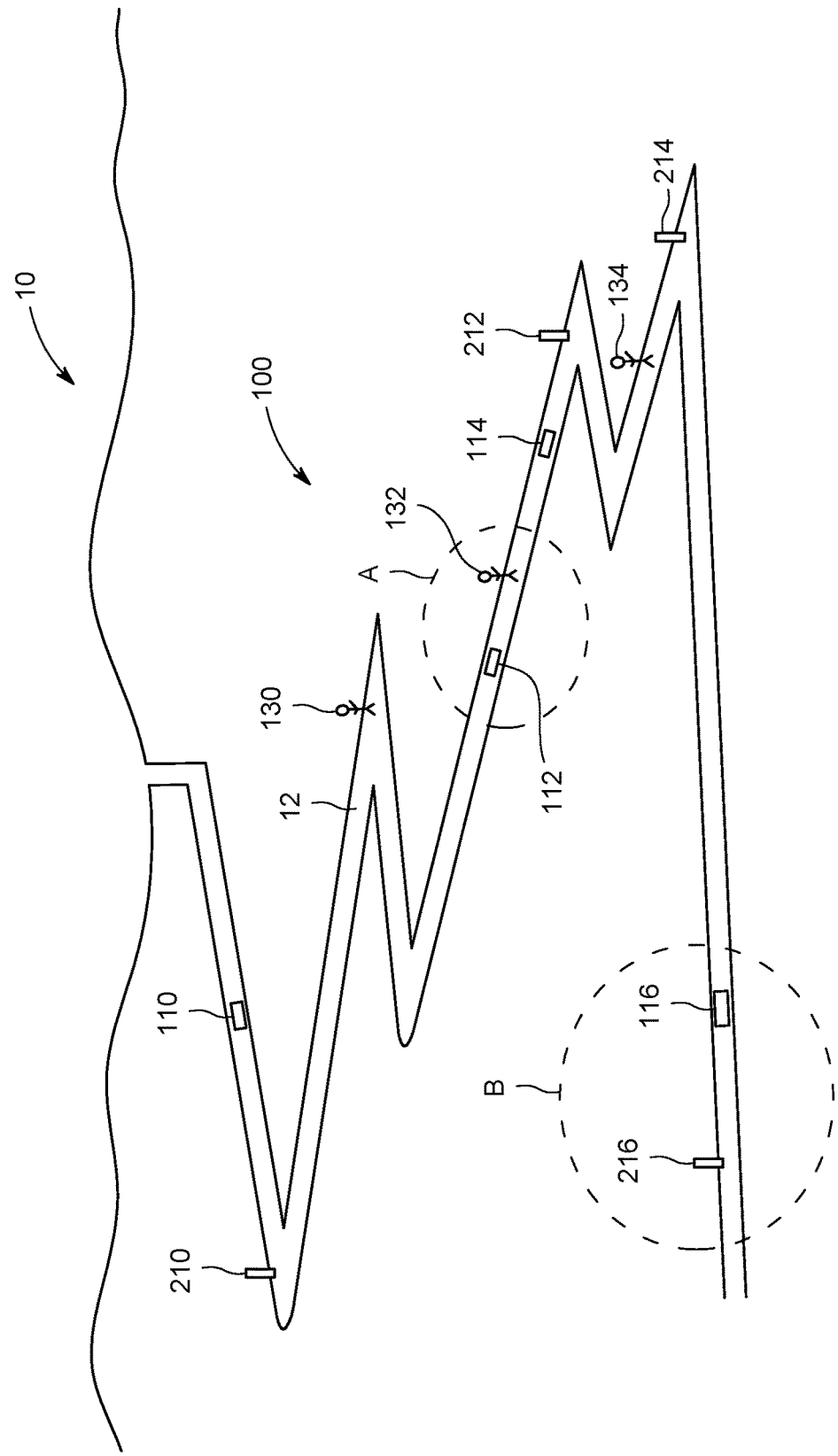
FIG. 1 is a simplified schematic illustration of a reception area showing a plurality of vehicles and personnel with which a position and proximity detection system may be utilized, according to an embodiment of the invention.

FIG. 1 schematically illustrates a reception area or environment 10 within which a position and proximity detection system 100 according to an embodiment of the invention may be utilized. As illustrated in FIG. 1, the reception area 10 may be an underground mine having a route 12 along which a plurality of mining vehicles and personnel are configured/designated to travel and operate. In an embodiment, the route 12 may be a haul route for the vehicles. In other embodiments, the reception area 10 may be any loosely defined area into and out of which vehicles or objects travel, such as a body of water (within which marine vessels travel), a roadway (on which automobiles, e.g., driver or driverless automobiles travel), a railway (on which locomotives travel), or other environment. As used herein, "reception area" means an area surrounding a vehicle or object equipped with a proximity detection unit of the invention.

Figure 2:
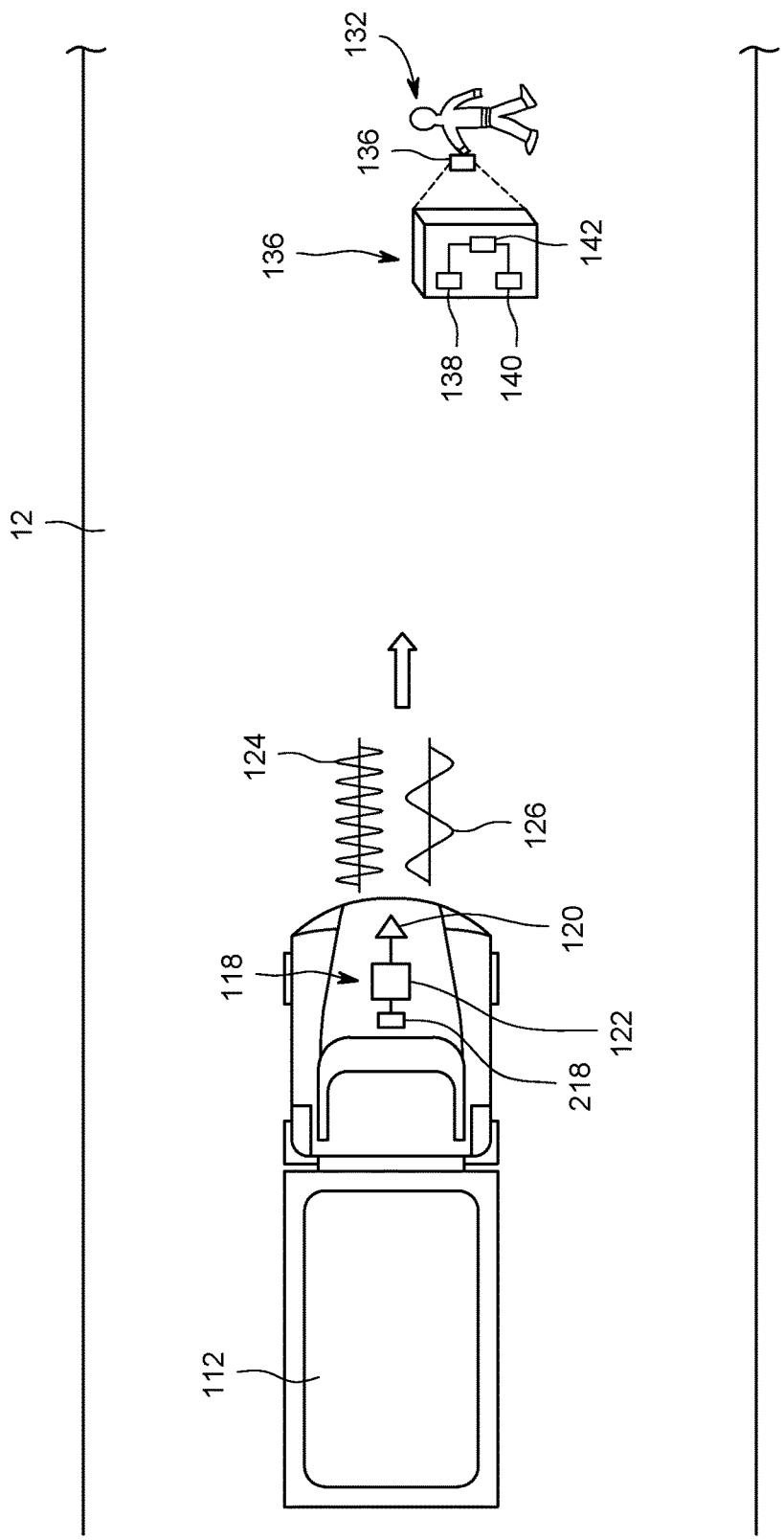
FIG. 2 is detail view of area A of FIG. 1, showing a vehicle equipped with a proximity detection system according to an embodiment of the invention.

The position and proximity detection system 100 includes one or more vehicles (e.g., vehicles 110, 112, 114, 116), each equipped with a proximity detection unit 118. As illustrated in FIG. 2, each proximity detection unit 118 includes a transceiver 120 and a control unit 122 (e.g., microprocessor-based circuit) electrically connected or otherwise communicatively coupled to the transceiver 120. In certain embodiments, the transceiver 120 may be separate transmitter/emitter and receiver devices. The proximity detection unit 118, including the transceiver 120, may be mounted anywhere within the vehicle 112 such as, for example, in the trunk of the vehicle or in an engine compartment of the vehicle. The transceiver 120 may be any type of transceiver known in the art and includes at least first and second output channels. In an embodiment, the first output channel is a high frequency RF channel and the second output channel is low frequency EM channel. The transceiver 120 is configured to generate both high RF signals, e.g., RF signal 124 (e.g., an RF broadcast), and EM pulse transmissions, e.g., EM pulse 126, utilizing the first and second channels, respectively.

As discussed hereinafter, the proximity detection units 118 are configured to detect vehicles or other objects within the reception area 10. In an embodiment, the transceiver 120, under control of the control unit 122, is configured to generate an unmodulated, short EM pulse 126 (e.g., a few oscillation cycles) synchronously with a modulated, RF signal 124 via the first and second channels, respectively. The EM pulse 126 and the RF signal 124 are of fixed duration. In an embodiment, EM pulse 126 does not carry any data and is only used for signal strength (distance) measurements, while the high RF signal 124 carries the identifying information of the transceiver 120 (i.e., it is modulated with a transceiver/emitter ID or vehicle ID). In an embodiment, the ID may be protected by a checksum.

With further reference to FIGS. 1 and 2, the system 100 also includes one or more receiver units 136 carried by, or associated with, objects or personnel within the reception area such as, for example, persons 130, 132, 134. The receiver units 136 each include an alternating or constant magnetic field receiver 138, an RF transceiver 140, and a processing module 142 (e.g., processor circuit) electrically connected to the magnetic field receiver 138 and RF transceiver 140. In an embodiment, the processing module 142 may be provided with information of the strength of the magnetic field emitted by the proximity detection units 118 of the system 100 (e.g., stored in non-transitory memory), as well as a lookup table or algorithm through which the processing module 142 may calculate the distance from the vehicle that generated the EM pulses, as discussed in detail hereinafter.

Figure 3:
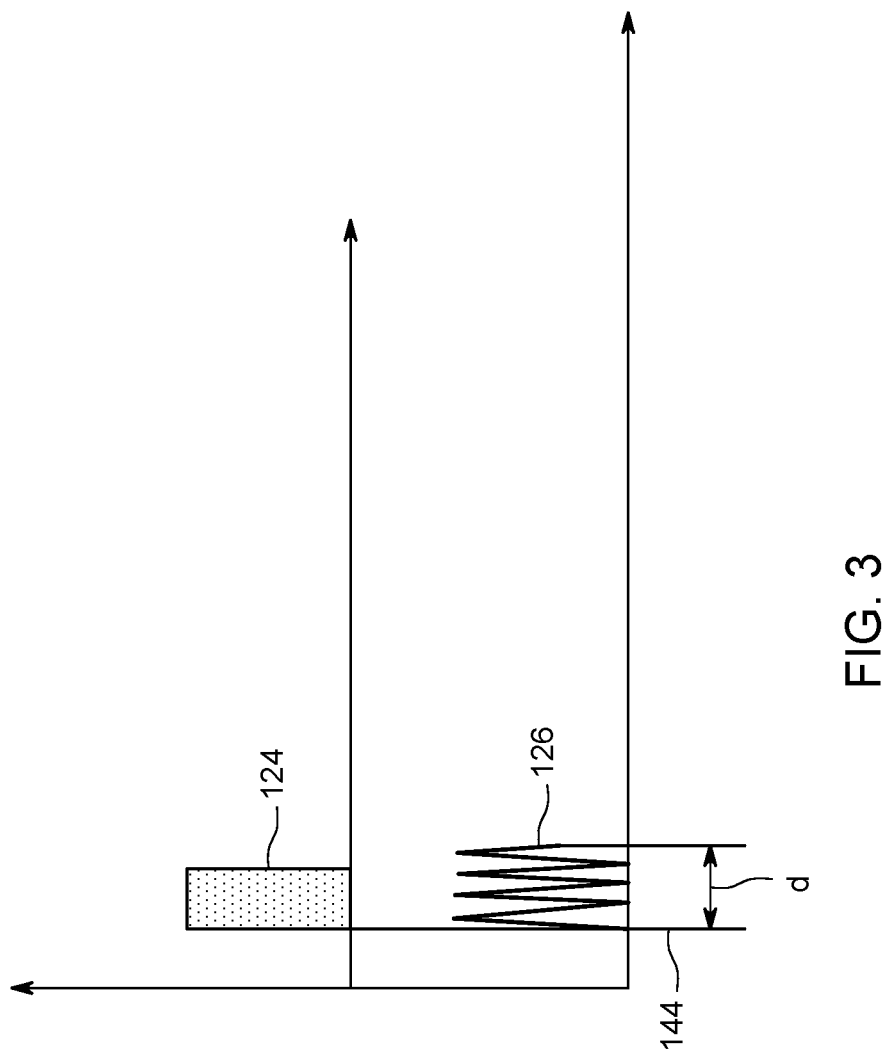
FIG. 3 is a diagram illustrating synchronous transmissions carried out by the proximity detection system of the invention.

In operation, as the vehicles 110, 112, 114, 116 travel throughout the reception area 10, the proximity detection units 118 on board each vehicle, via the emitter (e.g., transceiver 120), synchronously transmit the RF signal 124 (carrying the transceiver/emitter and/or vehicle ID) and EM pulses 126. For example, as illustrated in FIG. 2, the proximity detection unit 118 on board the first vehicle 112 generates the RF and EM transmissions 124, 126, respectively, which then propagate through space until they reach another vehicle or object within the reception area 10 (such as person 132 carrying receiver unit 136). The magnetic field receiver 138 of the receiver unit 136 receives the EM pulses 126, while the RF transceiver 140 receives the RF signal 124. The start time of the received RF signal 124 and the start and stop time of the every detected EM pulse 126 are recorded by the processing module 142 and are used to verify the EM pulse duration and its synchronicity with the RF signal in order to link the RF signal 124 and EM pulses 126 to one another. In particular, with reference to FIG. 3, the synchronous start 144 of the RF signal 124 and EM pulse 126 is verified on the receiving end (i.e., at the receiving unit 136). Likewise, the EM pulse duration, d, is measured on the receiving end (i.e., at the receiving unit 136). This ensures that no two EM transmissions from two different transmitters can be mistaken for each other on the receiving end. The transmissions are either received clearly and accepted, or rejected if the RF signal checksum fails or the EM signal duration is measured incorrectly due to a rare RF collision or EM noise.

Moreover, in order to arbitrate concurrent communications from competing transceivers, such as transceivers deployed on other vehicles within the reception area 10, the control unit 122, on the high RF channel, may employ a listen-before-talk mechanism with a random back-off delay. In particular, the control unit 122 may, prior to generating the transmissions, sense or "listen" to the radio environment within the reception area 10 to prevent concurrent transmission from competing transceivers. Essentially, the control unit 122 is configured to ensure that the reception area 10 is clear of competing transmission prior to RF and EM transmission.

After receiving the RF transmission 124 and EM pulses 126, and linking the transmissions to one another to verify the source, the processing module 142 of the receiver unit 136 determines the distance between the receiver unit 136 (carried by person 132) and the emitter 120 on-board the first vehicle 112 (and thus the vehicle 112) in dependence upon the strength of the received magnetic field, where a certain level of a received signal indicates a certain distance. For example, in certain embodiments, the distance measurement may be based on the generated magnetic field intensity. In particular, the generated field power is calibrated and known. The relationship between field intensity and distance is also known and sampled. The transceiver/receiver that receives the transmissions measures the field intensity and matches it with a prerecorded distance in a lookup table stored in memory of the processing module 142. In other embodiments, a model based on the known physical formulas for EM field propagation can be utilized.

As indicated above, the processing module 142 of the receiver unit 136 may be preconfigured with the emitted field strength (which is typically a fixed value for the entire system 100). In other embodiments, the strength of the field emitted by the proximity detection unit 118 may be transmitted from the proximity detection unit 118 to the receiver unit 136 via the RF channel in addition to the transceiver/vehicle ID information. The emitted field strength and the received field strength values may then be utilized by the processing module 142 to calculate or determine the distance from the first vehicle 112 from which the transmissions were made, such as via a lookup table or algorithm stored in memory. Once the field strength has been converted to a distance measurement by the processing module 142 of the receiver unit 136, this measurement is communicated back to the proximity detection unit 118 of the first vehicle 112 via the RF channel (i.e., RF transceiver 140 to originating transceiver 120). This distance measurement may then be used by control unit 122 on board the first vehicle 112 to determine a vehicle action to be taken (e.g., continue on route, change route, slow, stop, notify an operator, etc.).

In addition to communicating the distance measurement back to the originating transceiver 120 of the first vehicle 112, the receiver unit 136 may also be configured to generate an alarm or alert if a preset 'safety' distance threshold has been breached. In an embodiment, the alert may be an audible alarm, a visual alert, or other sensory alert. For example, the receiver unit 136 may include one or more LEDs, vibrators, speakers or the like for attracting a user's attention to the fact that the preset safety threshold has been breached. This alert may prompt an operator to increase the distance between himself/herself and the vehicle, or to seek a safe location until the vehicle passes by.

The proximity detection system 100 of the invention is therefore configured to determine the proximity of vehicles operating within the reception area 10 to any object or person outfitted with a receiver unit 136, and to generate alerts or notifications (either at the receiver unit 136 or the vehicles themselves, or both). In this way, operational safety within the reception area may be increased, and bottlenecking or backups may be minimized.

In certain embodiments, the transceiver 120 on board the vehicles may include an EM or constant magnetic field receiver, so that distances between vehicles may be determined.

It is contemplated that the RF transmission frequency of the high RF signal may include all frequencies within the megahertz (MHz) to gigahertz (GHz) range. Thus, in an embodiment, the high RF signal is at least 1 MHz. In various embodiments, the RF signal frequency is on the lower end of the MHz to GHz range. The higher the frequency, the quicker the signal, which allows more vehicles to be present within the reception area as compared to existing systems. Accordingly, a higher frequency may be utilized where a high volume of vehicle traffic is anticipated. In certain embodiments, the frequency for the RF signal may be selected in dependence upon a number of factors including the number of vehicles that are anticipated or estimated to be present in a particular reception area at a given time and the particular application for which the system is used (e.g., on a roadway, within an underground mine, etc.). For example, in underground mining applications, it may be desirable to use a lower frequency for the RF signal, where a direct line-of-sight between vehicles operating within the space is not always present. This is because the lower the frequency, the less dependent the system is on the availability of a direct line-of-sight (which is often not possible within the many twists and turns of a mine), due to the RF wave diffraction (i.e., bending around corners) and the ability to penetrate walls within the mine.

In an embodiment, the EM frequency may be as low as zero (i.e., a constant magnetic field, but not electrical). In such a case, the detector of the transceiver will sense a momentary change in the magnetic field of the earth and derive the induced vector from it, based on a pre-measured baseline. In an embodiment, the EM frequency is selected to be as low as possible, as there are less induced currents in metallic objects placed in between the transmitter and receiver, and there is less of the associated field intensity loss due to such induced currents. In addition, selecting a low frequency for the EM pulses achieves a much higher immunity to various EM noises coming from possible electrical and electronic devices located within the reception area. Utilizing a constant magnetic field allows any alternating EM noise to be filtered out. In connection with the above, utilizing a constant magnetic field is possible because the EM field is not used as a data carrier. This has heretofore not been possible with existing systems, because the EM field had typically been used as a data carrier.

As a result of the much shorter transmission time as compared to existing electromagnetic energy based distance measuring systems, the time taken to measure the distance between the transmitter and receiver (i.e., the distance between vehicles), and to uniquely identify the transmitter, is greatly reduced. In particular, the system and method of the invention allows transmission times to be reduced from about 100 to about 500 times compared to existing system and methods. Moreover, the multiple transceiver time slot arbitration issue present in many existing systems is resolved by using a listen-before-talk mechanism employed by embodiments of the control unit. This, in turn, allows for more vehicles or objects to operate within the reception area, and for shorter periods of time in between the distance measurements.

While the system 100 described above may be utilized to determine the proximity of vehicles to any mine personnel and other objects carrying or outfitted with a receiver unit in order to prevent vehicle incursions into areas where personnel are operating, there may also remain a need to determine the absolute position of the vehicles 110, 112, 114, 116 within the mine or reception area 10, irrespective of other personnel or objects within the reception area. In order to address this issue, the vehicles 110, 112, 114, 116 operating within the reception area may also be outfitted with an on-board navigation system that is configured to determine or calculate the position of the vehicle within the reception area 10 (e.g., an underground mine), and the reception area 10 may be configured with a plurality of fixed-position beacons 210, 212, 214, 216 that are configured to communicate with the vehicles, as further shown in FIG. 1.

The beacons 210, 212, 214, 216 each include a respective transceiver unit that enables communication with the vehicles when the vehicles are in range, such as, for example, by way of radio communications. In an embodiment, the beacons 210, 212, 214, 216 are configured to transmit their position/location within the reception area 10 to the vehicles that pass within range of the respective beacon. In other embodiments, the beacons 210, 212, 214, 216 are configured to transmit identifying information to the vehicles within range, which may then be cross-referenced with a database on-board the vehicle that indicates the specific location of the communicating beacon within the reception area 10 based on the received beacon ID.

Figure 4:
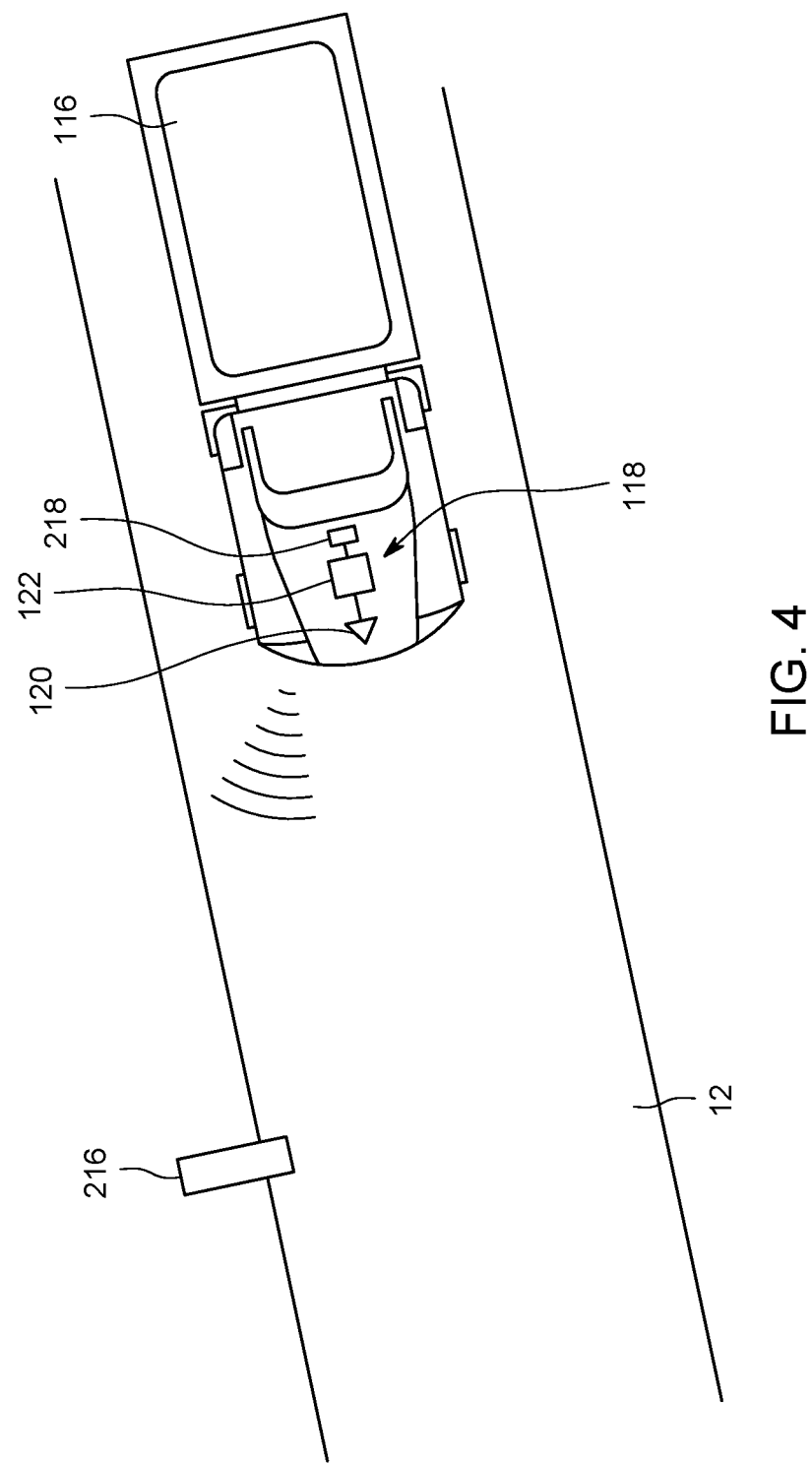
FIG. 4 is a detail view of area B of FIG. 1.

With reference to FIG. 4, the navigation system 218 on-board each vehicle (e.g., vehicle 116) includes an inertial platform type navigation device that may employ, for example, motion sensors (accelerometers) and rotation sensors (gyroscopes) to continuously calculate via dead reckoning the position, orientation, and velocity (i.e., direction and speed of movement) of the vehicle 116 without the need for external references. The vehicle 116 is configured to communicate with the beacons 210, 212, 214, 216, as well as with other vehicles, when the vehicle 116 is in range. For example, as shown in FIG. 4, the vehicle 112 is configured to communicate via its transceiver 120 with beacon 216 as it passes by the beacon 216. In an embodiment, the transceiver 120 and control unit 122 may be the same transceiver and control unit used for proximity detection, as discussed above. In other embodiments, the transceiver 120 and control unit 122 may be standalone devices.

In operation, each vehicle (e.g., vehicle 116) is configured to maintain a history or log of its exact movements throughout a given area, such as along the haul route 12, using the navigation device 218 on board the vehicle 112. In particular, each vehicle 116, using the on-board navigation device 218, is configured to calculate, via dead reckoning, its position within the reception area 10. The recorded position of the vehicle 116 may then be transmitted (such as through a radio link) to other vehicles within range, such as vehicles 112, 114, to ensure that collisions are avoided. During vehicle travel, however, the estimated position of each vehicle (as determined by the on-board navigation device 218) may vary from the actual position of each such vehicle. The system 100 is configured to zero out any such accumulated error or drift (i.e., the actual position of the vehicle in relation to the estimated position as determined by the navigation device 218) through the use of the beacons 210, 212, 214, 216.

In particular, as the vehicles 110, 112, 114, 116 pass within range of the beacons 210, 212, 214, 216 (the exact position of which are known and logged, as discussed above), the estimated position of any such vehicle is 'updated' with a precise, known position received from the beacon. As a result, while drift or error in the estimated position of a vehicle can accumulate as the vehicles are traveling between beacons, passing by any beacon within the reception area 10 essentially 'resets' or recalibrates the control unit 122 and navigation device 218, preventing any accumulated error or drift from propagating throughout a vehicle's entire path of travel.

In an embodiment, the position determination system 100 may also be utilized to create a 'breadcrumb' trail for subsequent use by mine operators for incident playback and the like. In particular, the path of travel (including time and location) of each vehicle may be logged by the on-board control unit 122 and transmitted back to the surface when the vehicle is in range (for example) of a Wi-Fi access point or a leaky feeder system within the mine. It is contemplated that this data can be used for efficiency, tire wear, uptime, in use time vs. idle time, etc.

While FIG. 1 shows the proximity detection system (i.e., vehicles equipped with an RF and EM pulse emitter/transmitter and objects and personnel outfitted with receiver units to calculate vehicle proximity) and the position determination system (i.e., vehicles equipped with an on-board navigation system and which are configured to communicate with static beacons within the reception area) as being a single, integrated system, it is contemplated that the system may be separate systems that can be deployed independently or in conjunction with one another. In particular, in certain embodiments, it is contemplated that the proximity detection capabilities may be deployed irrespective of position determination functionality, and vice versa. For example, in an embodiment, the system 100 may include the vehicles outfitted with navigation systems that are configured to estimate the position of the respective vehicle within the reception area, and the beacons arranged at various locations within the reception area 10 that provide the vehicles passing thereby with known (or absolute) reference points so that any accumulated navigational error can be zeroed out. In other embodiments, the system 100 may include vehicles outfitted with proximity detection units that are configured to emit RF signals and EM pulses, and objects or personnel carrying receiver units that are configured to receive the RF signals and EM pulses and calculate the proximity of the emitting vehicles. That is, proximity detection and position determination functionality may be integrated into a single, comprehensive system, or may deployed separately and independently from one another.

In any of the embodiments herein, the high RF signal may be a high RF broadcast, referring to a signal that is transmitted generally throughout an area and without a particular or designated recipient.

In an embodiment, a system is provided. The system includes a first vehicle having an emitter configured to emit a high RF signal synchronously with at least one EM pulse, and a receiver unit located remote from the first vehicle, the receiver unit including a magnetic field receiver, an RF transceiver, and a processing module coupled to the RF transceiver and the magnetic field receiver. The receiver unit is configured to receive the high RF signal and the at least one EM pulse from the first vehicle and to determine a proximity of the first vehicle to the receiver unit. In an embodiment, the high RF signal is modulated with an emitter/transceiver ID and/or vehicle ID. In an embodiment, the emitter or vehicle ID is protected by a checksum. In an embodiment, the at least one EM pulse does not carry any data. In an embodiment, the proximity of the first vehicle to the receiver unit is calculated in dependence upon received magnetic field strength. In an embodiment, the processing module of the receiver unit is configured to generate an alert if the determined proximity of the first vehicle is within a preset range. The alert may be at least one of an audible alert, a visual alert, and/or a vibratory alert. In an embodiment, the receiver unit is configured to communicate the determined proximity back to the first vehicle. In an embodiment, the first vehicle is a mining vehicle operating in an underground mine. In an embodiment, the receiver unit is configured to verify that the RF signal and the at least one EM pulse occurred synchronously.

In another embodiment, a method is provided. The method includes the steps of, at a first vehicle, synchronously generating a high RF signal and at least one EM pulse; at a receiver unit, receiving the high RF signal and the at least one EM pulse; and at the receiver unit, determining a distance between the first vehicle and the receiver unit in dependence upon a strength of the at least one EM pulse received by the receiver unit. In an embodiment, the method may also include the step of, prior to generating the high RF signal and the at least one EM pulse, checking for a competing transmission from a second vehicle. In an embodiment, the method may also include the step of, at the receiver unit, verifying that the transmission of the high RF signal and the at least one EM pulse occurred synchronously. In an embodiment, the method may also include the step of, at the receiver unit, measuring a duration of the at least one EM pulse. In embodiment, the method may also include the step of modulating the high RF signal with a transceiver ID and/or vehicle ID. In an embodiment, the transceiver or other ID is protected by a checksum. In an embodiment, the at least one EM pulse does not carry any data. In an embodiment, the first vehicle is an autonomous vehicle. In an embodiment, the method may also include, at the receiver unit, generating an alert if the distance is below a predetermined threshold or within a preset range. In an embodiment, the method may further include the step of communicating the determined distance back to the first vehicle.

In an embodiment, a system includes a receiver unit having a magnetic field receiver, an RF transceiver, and a processing module coupled to the RF transceiver and the magnetic field receiver. The RF transceiver is configured to receive a high RF signal from a vehicle that is remote from the receiver unit. The magnetic field receiver is configured to receive at least one EM pulse from the vehicle. The processing module is configured to verify that emission of the high RF signal and the at least one EM pulse from the vehicle occurred synchronously. The processing module is further configured, responsive to verification that the emission occurred synchronously, to determine a proximity of the vehicle to the receiver unit based on at least one of the high RF signal or the at least one EM pulse. The processing module is further configured, responsive to verification that the emission did not occur synchronously, to reject the high RF signal and the at least one EM pulse for use in determining the proximity.

In another embodiment, a system includes a first vehicle having an on-board navigation system configured to determine a position of the first vehicle within a reception area without external references, and at least one beacon positioned at a location within the reception area along a route over which the first vehicle travels. The at least one beacon stores location data of the at least one beacon within the reception area. The first vehicle is configured to wirelessly receive the location data from the at least one beacon when the first vehicle passes within range of the at least one beacon. For example, the first vehicle and the at least one beacon may be configured to communicate over a radio link.

In an embodiment, a system includes a first vehicle having an on-board navigation system configured to determine a position of the first vehicle within a reception area without external references, and at least one beacon positioned at a location within the reception area along a route over which the first vehicle travels. The at least one beacon stores location data of the at least one beacon within the reception area. The first vehicle is configured to receive the location data from the at least one beacon when the first vehicle passes within range of the at least one beacon. The first vehicle includes a receiver and a control unit electrically coupled to the receiver and the navigation system. The control unit is configured to utilize the location data from the at least one beacon to eliminate errors in the position of the first vehicle as determined by the navigation system. In an embodiment, the navigation system is configured to determine the position of the first vehicle via dead reckoning.

While embodiments of the invention are suitable for use with both mobile and stationary implementations, for ease of explanation a mobile implementation is described in detail herein. More specifically, an underground mining vehicle has been selected for clarity of illustration for the disclosure of mobile embodiments. Other suitable vehicles include, for example, automobiles and other on-road vehicles, locomotives, construction vehicles/equipment, and other off-road vehicles, marine vessels, and autonomous vehicles (e.g., driverless automobiles). As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily a mechanical attachment.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
a magnetic field receiver configured to receive an electromagnetic (EM) pulse emitted by an external object;
a radio frequency (RF) transceiver configured to receive an RF signal emitted by the external object;
a processing unit configured to determine an identity of the external object and a distance between the external object and the magnetic field receiver based on the EM pulse and the RF signal that are received; and
wherein the processing unit is configured to determine whether the EM pulse and the RF signal were emitted by the external object or by the external object and at least one other external object by determining whether the EM pulse and the RF signal were synchronously emitted.

2. The system of claim 1, wherein the external object is a vehicle.

3. The system of claim 1, wherein the processing unit is configured to determine the identity of the external object from among plural external objects based on the RF signal that is received by the RF transceiver.

4. The system of claim 1, wherein the processing unit is configured to determine the distance of the external object from the magnetic field receiver based on a magnitude of the EM pulse that is received by the magnetic field receiver.

5. The system of claim 1, wherein the processing unit is configured to communicate a signal to the external object responsive to the distance of the external object from the magnetic field receiver being less than a designated distance.

6. The system of claim 1, wherein the magnetic field receiver is configured to receive the EM pulse without data being included in the EM pulse.

7. The system of claim 1, wherein the magnetic field receiver is configured to receive plural EM pulses from plural different external objects and the RF transceiver is configured to receive plural RF signals from the plural different external objects, and
wherein the processing unit is configured to determine which of the plural different external objects emitted the plural EM pulses based on times at which the EM pulses were received by the magnetic field receiver and times at which the RF signals were received by RF transceiver.

8. The system of claim 1, wherein the magnetic field receiver is configured to receive plural EM pulses from plural different external objects and the RF transceiver is configured to receive plural RF signals from the plural different external objects, and
wherein the processing unit is configured to determine which of the plural different external objects emitted the plural EM pulses based on times at which the EM pulses were received by the magnetic field receiver and identification data included in the RF signals received by RF transceiver.

9. The system of claim 1, wherein the external object is a beacon and the processing unit is configured to be disposed onboard a vehicle, and
wherein the processing unit is configured to determine a location of the vehicle based on the EM pulse and the RF signal that are received from the beacon.

10. The system of claim 9, wherein the processing unit is configured to modify a different location of the vehicle as determined by a navigation system of the vehicle based on the location of the vehicle that is determined based on the EM pulse and the RF signal that are received from the beacon.

11. A method comprising:
receiving an electromagnetic (EM) pulse emitted by an external object at a magnetic field receiver;
receiving a radio frequency (RF) signal emitted by the external object at an RF transceiver;
determining an identity of the external object and a distance between the external object and the magnetic field receiver based on the EM pulse and the RF signal that are received; and
further comprising determining whether the EM pulse and the RF signal were emitted by the external object or by the external object and at least one other external object by determining whether the EM pulse and the RF signal were synchronously emitted.

12. The method of claim 11, wherein the identity of the external object is determined from among plural external objects based on the RF signal that is received.

13. The method of claim 11, further comprising communicating a signal to the external object responsive to the distance of the external object from the magnetic field receiver being less than a designated distance.

14. The method of claim 11, further comprising modifying a location of the vehicle as determined by a navigation system of the vehicle based on the identity of the external object and the distance between the external object and the magnetic field receiver that are determined.

* * * * *